ELECTRON BEAM DEFLECTION SPEED-UP CIRCUIT

Filed April 1, 1966 3 Sheets-Sheet 1

INVENTORS
MELVIN V. DUERR
MAURITZ L. GRANBERG
JEROME J. STOFFEL
BY Thomas J. Nikolai
ATTORNEY

ELECTRON BEAM DEFLECTION SPEED-UP CIRCUIT

Filed April 1, 1966 3 Sheets-Sheet 2

INVENTORS
MELVIN V. DUERR
MAURITZ L. GRANBERG
JEROME J. STOFFEL

BY Thomas J. Nikolai
ATTORNEY

ELECTRON BEAM DEFLECTION SPEED-UP CIRCUIT

Filed April 1, 1966 3 Sheets-Sheet 3

INVENTORS
MELVIN V. DUERR
MAURITZ L. GRANBERG
JEROME J. STOFFEL
BY Thomas J. Nikolai
ATTORNEY United States Patent Office 3,378,720

Patented Apr. 16, 1968

3,378,720

ELECTRON BEAM DEFLECTION SPEED-UP CIRCUIT

Melvin V. Duerr and Mauritz L. Granberg, Minneapolis, and Jerome J. Stoffel, Farmington, Minn., assignors to Sperry Rand Corporation, New York, N.Y., a corporation of Delaware Filed Apr. 1, 1966, Ser. No. 539,443
4 Claims. (Cl. 315—27)

Figure 1:
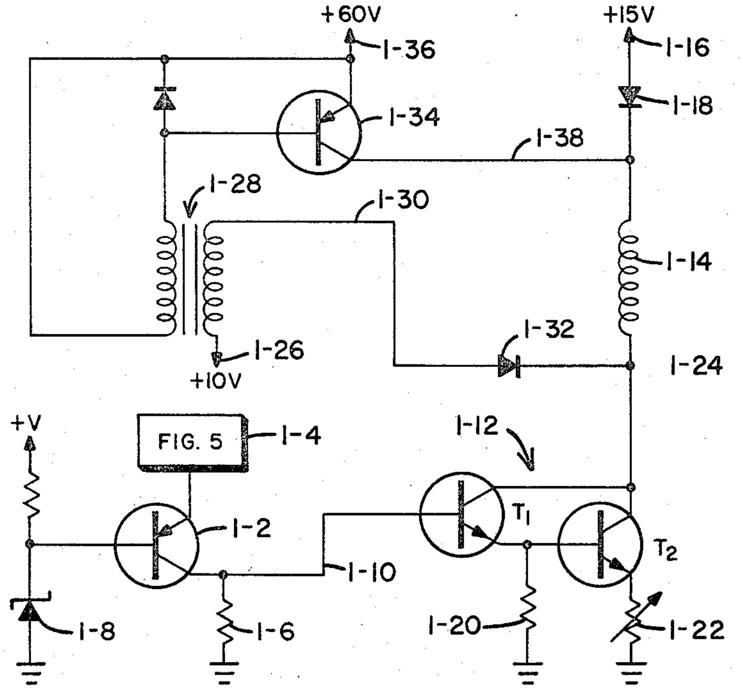

This invention relates to a cathode ray tube beam sweep circuit and in particular, the idea and design for a speed-up circuit in the horizontal and vertical portions of the electromagnetic deflection system which speeds up point-to-point movement of the scanning electron beam by suddenly applying a large deflection voltage across the horizontal and vertical deflection coils.

In commonly assigned copending application Ser. No. 436,174, filed Mar. 1, 1965, there is disclosed a cathode ray tube display system in which the electron beam scans the face of the cathode ray tube in steps in both the horizontal and vertical directions. To obtain horizontal motion of the scanning beam during character generation, thirty-two steps of current from five stages of a counter are, via the deflection amplifier, supplied to the horizontal deflection coil. During normal scanning on a line-to-line basis, these current steps rise gradually to a fixed level and then suddenly drop to zero to repeat the process over again. The thirty-two steps of current, when sent through the horizontal deflection coil, cause the electron beam to move in steps from left to right and then retrace rapidly from right to left. A horizontal positioning coil is necessary to position the beam at the left side of the face of the cathode ray tube when the deflection current is zero if the deflection circuit is single-ended rather than push-pull.

In addition to character generation, the display unit disclosed in the above mentioned copending application was designed to provide random positioning for map and vector display. To permit the display of maximum information within a given unit of time, it is necessary to speed up the scanning beam as it paints a line for map and vector display. The X, Y coordinates of these points are stored in the horizontal and vertical deflection counter stages. Thus, as the beam moves from point-to-point painting characters, it may be desirable to suddenly move the beam some distance across the face of the cathode ray tube to paint a vector. This would require a considerable amount of time if the beam had to move step by step in order to paint the vector. Therefore, a speed-up circuit is necessary in order to cause the beam to cease movement by small incremental steps of current and to move quickly to the desired point on the face of the tube.

No known prior art systems exist in which the electron beam is caused to move in equal increments and then suddenly caused to move at an increased rate to another point on the cathode ray tube face or screen. Prior art patents such as Patent No. 3,111,603, do exist which increase beam speed during the retrace time. At the end of the trace period, a large flyback voltage pulse from the yoke, the magnitude of which exceeds the supply voltage, is impressed across the emitters of a transistor pair which allows a faster retrace interval.

The present invention allows the beam sweep time to be increased during the trace time as well as during retrace time by suddenly coupling a large deflection voltage across the deflection coil. It is inexpensive since the circuit design allows the use of standard components. Further, power requirements are modest.

As stated above, the increase in beam sweep speed is accomplished by suddenly applying a large voltage to a first terminal of the deflection coil. During character generation, the sequential action of the counter stages in the digital-to-analog converter provides fixed, gradual increments of current to the deflection coil. Consequently, the induced voltage variations or "kicks" across the deflection coil are relatively small in amplitude and the voltage on the second terminal of the coil will never fall below a clamp voltage used to bias a diode which is connected to said second terminal. However, during map and vector display, the counter is not necessarily stepped in sequence. Depending upon the X, Y coordinates which define the destination point, all of the counter stages, or any variation thereof, could be simultaneously set. Accordingly, large variations in the current steps occur which, on one side of the biased diode, momentarily cause the induced voltage to subtract from the supply voltage and, at said second terminal, reduce it to a value below the clamp voltage applied to the biased diode. When this happens, the diode becomes forward biased and a current will be caused to flow through the primary of a transformer to induce a trigger pulse in the secondary winding which suddenly turns on a transistor. This transistor couples a high potential supply voltage source to the deflection coil thereby providing a deflection voltage of increased magnitude to speed up the scanning beam as it paints a line to the new point. When the induced deflection voltage is collapsing and causes the voltage at said second terminal to reach a value which exceeds the diode bias voltage, the diode is again reverse biased and the transistor is cut-off thus removing the high potential source from the deflection coil. To reduce both trace and retrace time, a push-pull circuit can be used with the inventive concept. Also, with a push-pull circuit, preposition coils are not required. Further, push-pull stages have less distortion than single-ended stages. The vertical portion of the deflection system contains identical circuitry and operates in the same manner as the horizontal portion described above except that the vertical deflection coil causes the scanning beam to move vertically across the screen. Between these two portions of the system and with different amounts of currents through each coil or sets of coils (as determined by the count in their respective digital-to-analog deflection counters), it is possible to quickly move the scanning beam anywhere on the face of the cathode ray tube.

Figure 2A:
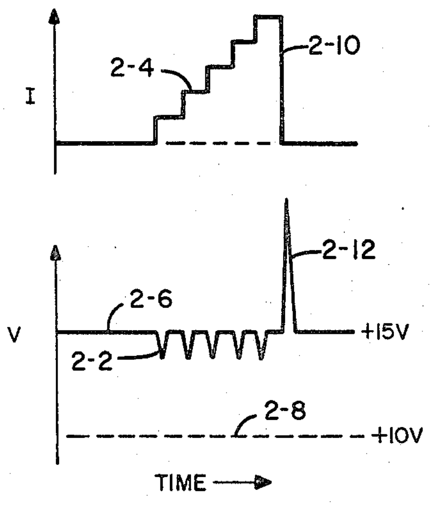
Figure 2B:
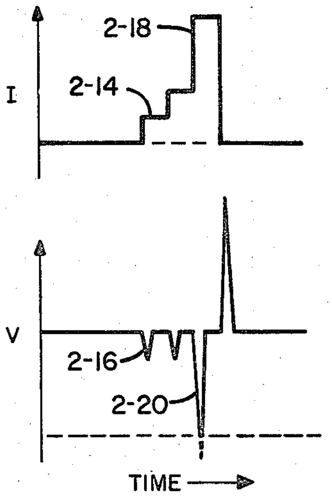
Figure 3:
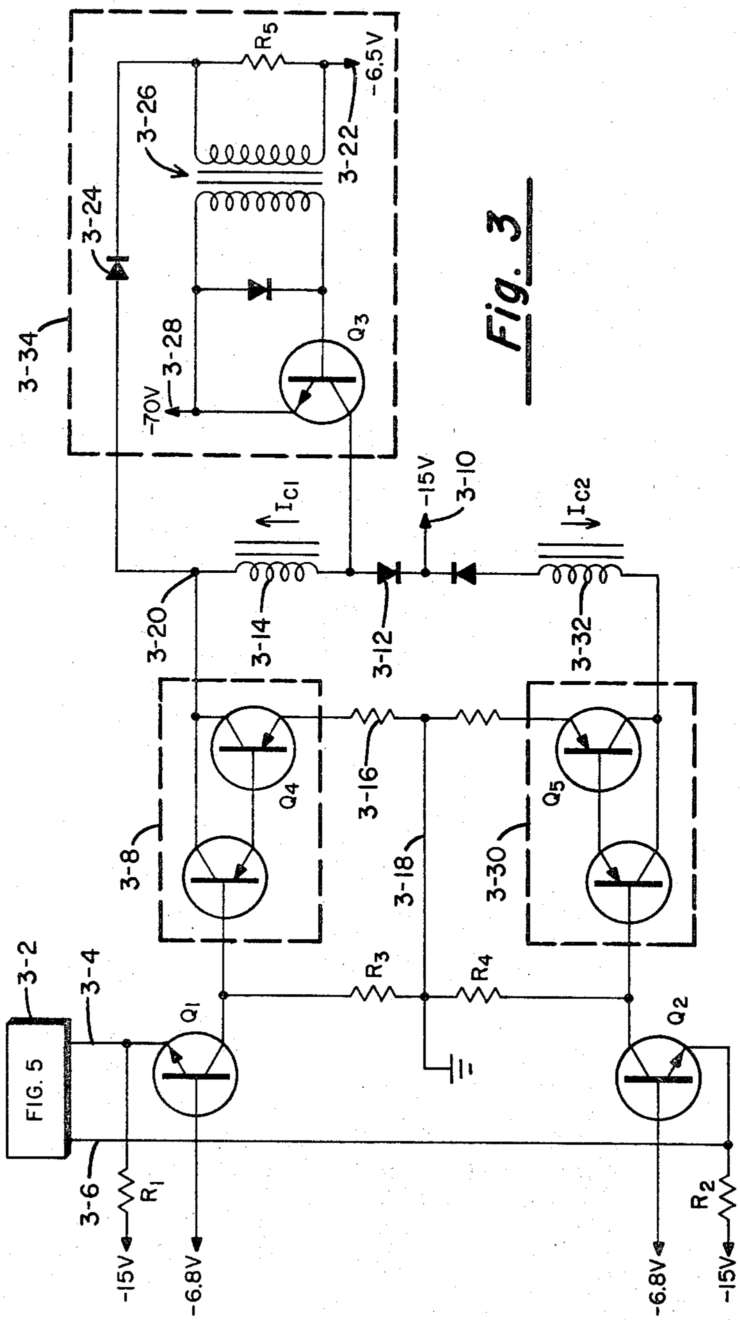
Figure 5:
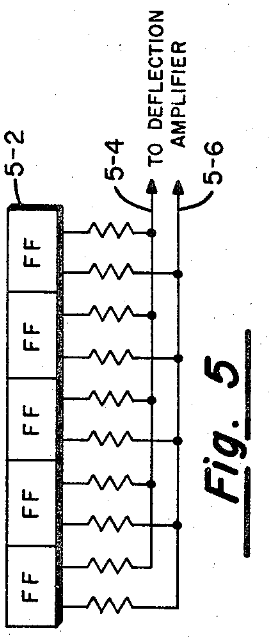
Figure 4A:
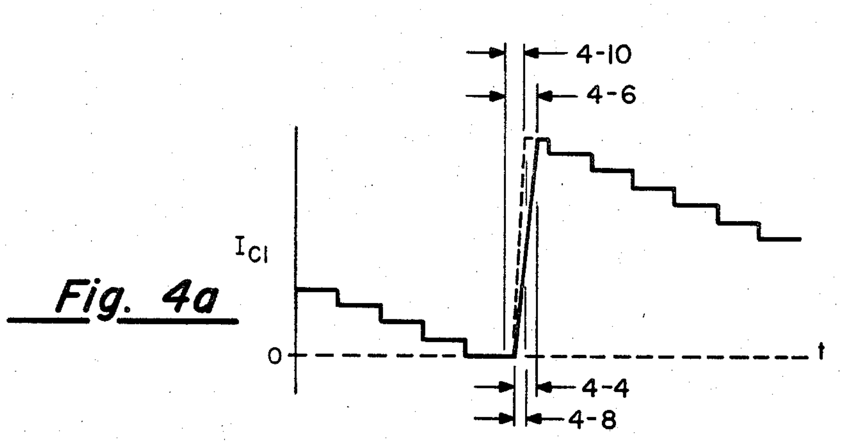
Figure 4B:
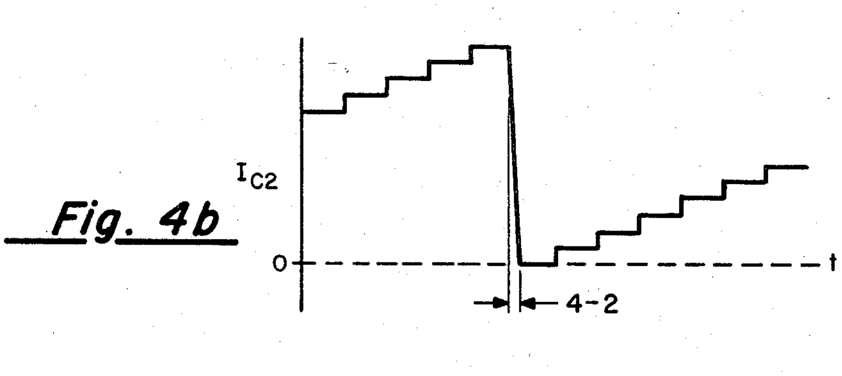
Figure 4C:
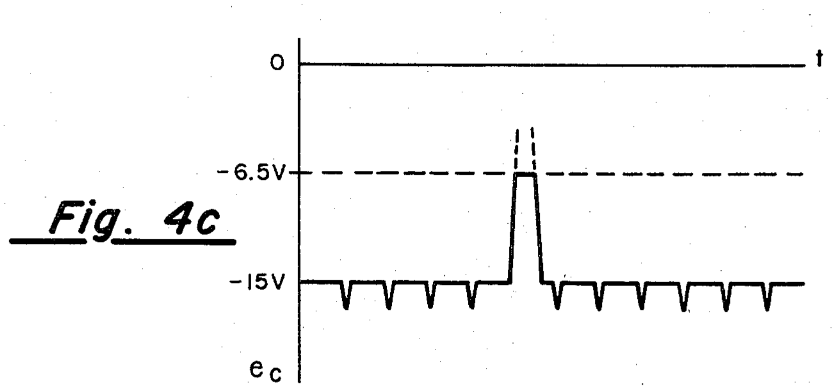

FIGURE 1 shows the circuit of the horizontal portion of a single-ended deflection system;

FIGURES 2*a* and 2*b* show the current and voltage waveforms in the single-ended system;

FIGURE 3 shows the circuit of the horizontal portion of a push-pull deflection system;

FIGURES 4*a*, 4*b*, and 4*c* show the current and voltage waveforms in the push-pull system; and FIGURE 5 is a schematic representation of the horizontal deflection counter shown in FIGURE 1 as a block connected to the emitter of the deflection amplifier.

FIGURE 1 shows the circuit of the horizontal portion of a single-ended deflection system which includes transistor 1–2 which acts as the horizontal deflection amplifier. Coupled to the emitter of transistor 1–2 is the horizontal deflection counter which is schematically shown in FIGURE 1 as block 1–4. The deflection counter is shown in detail in FIGURE 5 and includes five stages 5–2 which produce thirty-two step variations of current to the deflection amplifier 1–2 via line 5–4. During scanning on a line-to-line basis, these current steps increase incrementally to a fixed level and then suddenly drop to zero to repeat the process over again. Referring again to FIGURE 1, the incremental current steps through horizontal amplifier 1–2 caused by horizontal counter 1–4 develops a voltage across resistor 1–6 coupled to the collector of amplifier 1–2. Zener diode 1–3 establishes a reference voltage on the base of transistor 1–2 which determines the amount of incremental current through deflection amplifier 1–2 as the deflection counter 1–4 changes.

The output voltage developed across resistor 1–6 by the incremental current steps is coupled via line 1–10 to the base of transistor $T_1$ in Darlington switch or amplifier 1–12. The Darlington amplifier is used, as is well known, to obtain better linearity of the current flow through deflection coil 1–14. The use of two transistors $T_1$ and $T_2$ provide a gain which is the product of the gain of the individual transistors. Thus, to obtain high gain, transistor $T_2$ does not have to operate in the non-linear portion of its characteristic curve. The output of deflection amplifier 1–2 on line 1–10 causes both transistor $T_1$ and transistor $T_2$ to increase conduction. Current flows from voltage source 1–16 through diode 1–18, deflection coil 1–14, the collectors and emitters of transistors $T_1$ and $T_2$ and through emitter resistors 1–20 and 1–22. Since the horizontal deflection coil 1–14 has an insignificant amount of D.C. resistance, very little voltage drop occurs across the coil with practically all the voltage drop occurring across transistors $T_1$ and $T_2$ and emitter resistors 1–20 and 1–22. Thus, the D.C. voltage appearing at point 1–24 is practically equal to that of the supply source 1–16. An induced voltage, however, of opposite polarity to that of source 1–16 is developed across deflection coil 1–14 according to the equation $E=LdI/dt$ whenever the current through the coil increases.

Bias voltage source 1–26 is also coupled to point 1–24 through the primary winding of transformer 1–28, conductor 1–30 and diode 1–32. Since bias voltage 1–26 is of smaller magnitude than source 1–16, diode 1–32 is normally back-biased and does not conduct. During normal operation, the sequential operation of the counter 1–4 provides fixed, gradual, step increments of current to the deflection coil. The induced voltage developed across the deflection coil 1–14 according to the equation, $E=LdI/dt$, always opposes, and thus is subtracted from, the magnitude of supply voltage 1–16. The difference between the supply voltage and the opposing induced voltage is present at point 1–24 and, under normal sequential operation of counter 1–4, never falls below the value of magnitude of bias voltage source 1–26. Since this is true, diode 1–32 is always back-biased during normal sequential operation of the counter 1–4. Because the voltage applied to the coil 1–14 from source 1–16 is constant, the rise time, $dI/dt$, of the increments of current through the coil is equal to $E/L$. In order to increase the rise time, $dI/dt$, and, thus, increase the beam speed, either E could be increased or L could be decreased. The present invention momentarily increases the value of E to increase the beam speed.

During map and vector display, the counter 1–4 is not necessarily stepped in sequence and, thus, the magnitude of the step variations is increased. Depending upon the X–Y coordinates which define the destination point, large step variations in the current may occur which cause the Darlington switch 1–12 to conduct more heavily and, in turn, causes a greater induced counter EMF across deflection coil 1–14. Which this happens, the voltage at point 1–24 momentarily falls below that of bias source 1–26 and diode 1–32 becomes forward biased and conducts. The current flowing through the primary winding of transformer 1–28 induces a voltage in the secondary winding of the transformer. This induced voltage turns on transistor 1–34 which, when it conducts, connects the high voltage supply 1–36 to the deflection coil 1–14 via conductor 1–38. This high voltage causes an extremely high rate of change of current, $dI/dt$, flowing through deflection coil 1–14 and causes the beam to move at a much faster rate. Since the induced voltage is only a temporary pulse, it tends to collapse towards the value of the bias voltage 1–26, i.e., it increases in value. When the voltage at point 1–24 exceeds the value of the bias voltage 1–26, diode 1–32 is again back-biased and stops conducting. Thus, transistor 1–34 is cut-off and removes the high voltage supply from deflection coil 1–14.

FIGURE 2*a* shows the current waveform 2–4 that would be found on conductor 1–10 in FIGURE 1 under normal operating conditions. With each step increment in current on conductor 1–10, it can be seen that an induced voltage 2–2 is produced across the deflection coil 1–14. Note that these induced voltage pulses subtract from and are lower in value than the voltage supply 1–16 which is designated by the line 2–6 in FIGURE 2*a*. Notice also that these induced voltage pulses are greater in value than diode bias supply voltage 1–26, which is designated by line 2–8 in FIGURE 2*a*, and it is for this reason that diode 1–32 is normally back-biased. When the counter 1–4 resets and the current on line 1–10 falls to zero as shown by numeral 2–10 in FIGURE 2*a*, a large flyback voltage pulse 2–12 of the opposite polarity is developed across the deflection coil and speeds up the rate at which the electron beam returns to the other side of the CRT screen.

FIGURE 2*b* shows the current and voltage waveforms which activate the novel beam speed-up circuit. Again, as the counter 1–4 causes the current to increase by steps 2–14 on conductor 1–10, voltage pulses 2–16 are induced across the deflection coil 1–14. Assume now that the counter 1–4 suddenly changes by several increments causing the magnitude of said step variations to increase on conductor 1–10 as shown by waveform 2–18. The large current change causes the Darlington switch 1–12 to conduct more and a larger counter EMF 2–20 is induced across deflection coil 1–14. This larger induced counter EMF momentarily reduces the voltage at point 1–24 to a magnitude below the value of bias voltage source 1–26. Thus, diode 1–32 conducts which causes transistor 1–34 to conduct and cause high potential source 1–36 to be connected to deflection coil 1–14 and, therefore a higher rate of current, $dI/dt$, flows through the deflection coil 1–14 which causes the electron beam to move at a faster rate across the CRT screen.

FIGURE 3 shows the circuit of the horizontal portion of a push-pull deflection system which uses the speed-up circuit both during the retrace interval and during forward movement of the beam as it traces from point to point. The speed-up circuit that is utilized only during the retrace interval is shown in FIGURE 3 since the circuit used during forward tracing of the beam is the same as the circuit that has been previously discussed in relation to FIGURE 1, and operates in the same manner. Both of the push-pull windings are wound on the same core and when current flowing through one core attempts to cease, the transformer action between the two windings causes an induced voltage which also attempts to stop the current flow in the other winding. Thus, during the retrace interval, the total time required for the retrace includes the time required for the first half of the push-pull circuit to turn off plus the time required for the other half of the push-pull circuit to turn on. The circuit in FIGURE 3 is used to reduce the turn-on time of the second half of the push-pull circuit and the circuit is designed to suddenly apply a large voltage across the deflection coil.

Transistor $Q_1$ acts as one-half of the horizontal push-pull deflection amplifier. Connected to the emitter of transistor $Q_1$ is one output of the horizontal deflection counter 3–2 on line 3–4. The other output of the counter of 3–2 on line 3–6 is coupled to the other deflection amplifier, $Q_2$, of the push-pull circuit. The output lines 3–4 and 3–6 from counter 3–2 are equivalent to the output lines 5–4 and 5–6 from counter 5–2 shown in FIGURE 5. The output from transistor $Q_1$ is developed across resistor R3 and is coupled to the Darlington switch or amplifier 3–8 and causes the switch to vary its amount of current conduction. This current flows from source 3–10 through isolation diode 3–12, the left section of the horizontal deflection coil 3–14, Darlington switch 3–8, load resistor 3–16, and ground via line 3–18. Normally, the voltage at point 3–20 approximates the voltage of the source 3–10 and it is more negative than bias source 3–22. Thus, diode 3–24 is normally back-biased and does not conduct.

At the beginning of the retrace interval, the current through deflection coil 3–32 collapses to a zero value while the current through deflection coil 3–14 tends to increase to a maximum. However, the collapsing of the current through coil 3–32 induces a voltage across coil 3–14 which prevents current from flowing through coil 3–14. After the current ceases flowing through coil 3–32, a large current begins to flow through coil 3–14. This causes a large counter EMF to be induced across coil 3–14. When this happens, the voltage at the point 3–20 rises above that of bias source 3–22 and diode 3–24 becomes forward biased and conducts. The current flowing through the primary winding of transformer 3–26 induces a voltage in the secondary winding of the transformer. This induced voltage turns on transistor $Q_3$ which, when it conducts, connects the high voltage supply 3–28 to the deflection coil 3–14 and causes the beam to move at a much faster rate. Since the induced voltage is only a temporary pulse, it tends to momentarily rise above the value of the bias voltage supply 3–22 and then it begins to decrease in value until once again it is more negative than bias supply 3–22. When the voltage at point 3–20 becomes more negative than the value of supply voltage 3–22, diode 3–24 is again back-biased and stops conducting. Thus, transistor $Q_3$ is again cut-off and removes the high voltage supply from deflection coil 3–14.

FIGURE 4 shows the current and voltage waveform of the push-pull system shown in FIGURE 3. FIGURE 4*a* shows the current steps, $I_{c1}$, through deflection coil 3–14. Deflection coils 3–14 and 3–22 are wound on the same core. Thus, when the transistors in Darlington switch or amplifier 3–30 turns off, the transformer action between the two deflection coils causes an induced voltage in winding 3–14 which tend to oppose the transistor in Darlington switch or amplifier 3–8. Thus, it will be seen in FIGURE 4*a* that the transistor $Q_4$ in Darlington switch 3–8 does not start to turn on appreciably until after the current has ceased to flow in deflection winding 3–22. Thus, the turn-off time 4–2 of Darlington switch 3–30 is shown in FIGURE 4*b* while in FIGURE 4*a* the turn-on time 4–4 of Darlington switch 3–8 is shown. The total turn-on time 4–6 is shown to be the sum of turn-off time 4–2 and turn-on time 4–4. The circuit of the present invention is used to speed-up the turn-on time 4–4 of Darlington switch 3–8 to the time shown by reference 4–8. In other words, although Darlington switch 3–8 cannot come on until after Darlington switch 3–30 has ceased conducting, switch 3–8 is caused to come on much faster with the present speed-up circuit. Thus, with the speed-up circuit, the total retrace time is reduced to that shown by reference 4–10.

If a second speed-up circuit identical to circuit 3–34 were connected across deflection coil 3–32, it would act in the manner already explained in relation to FIGURE 1 to cause the point-to-point tracing of the scanning electron beam to be increased in speed. Thus, the circuit shown in FIGURE 3 acts not only to increase the speed of movement of the electron beam from point-to-point when necessary, but also it acts to reduce the retrace time of the electron beam.

It is understood that suitable modifications may be made in the structure as disclosed provided such modifications come within the spirit and scope of the appended claims. Having now, therefore, fully illustrated and described our invention, what we claim to be new and desire to protect by Letters Patent is:

1. In an electron beam deflection circuit including a deflection coil having first and second terminals, a first source of potential coupled to said first terminal of said deflection coil, an amplifier coupled to said second terminal of said deflection coil and means connected to said amplifier for causing step variations of current to flow through said coil for point-to-point tracing by said electron beam and for causing the magnitude of said step variations to increase for map and vector tracing, the improvement comprising a beam speed-up circuit for said map and vector tracing, said speed-up circuit comprising:
(a) a second source of potential having a magnitude greater than said first source of potential,
(b) means coupled to said second terminal of said deflection coil for detecting said magitude increase of step variations and producing a signal indicative thereof, and
(c) means connected to said second potential, to said detecting means, and to said first terminal of said deflection coil for applying said second potential to said coil in response to and for the duration of said signal.

2. A device as defined in claim 1 wherein said detection means comprises:
(a) a bias voltage source of the magnitude of which is less than said first source of potential,
(b) a diode coupled to said second terminal of said coil, said second terminal being at a potential greater than said bias voltage during normal step variations of current and at a potential less than said bias voltage during said step variation increase of said current, and
(c) a transformer having primary and secondary windings, said primary winding being coupled between said bias voltage source and said diode for biasing said diode in a non-conducting state during said normal step variation of current and a conducting state during said step variation increase of said current, said secondary winding producing a signal only when said diode conducts.

3. A device as defined in claim 2 wherein said means for applying said second potential to said coil comprises:
(a) a transistor having first, second and third elements,
(b) means coupling said first element to said secondary winding of said transformer for receiving said signal indicative of said step current increase,
(c) means coupling said second element to said second source of potential, and
(d) means coupling said third element to said first terminal of said deflection coil whereby said transistor conducts only when said signal is received thereby to connect said second source of potential to said first terminal of said deflection coil.

4. A device as defined in claim 3 wherein:
(a) said first transistor element is the base,
(b) said second transistor element is the emitter, and
(c) said third transistor eelment is the collector.

No references cited.

RODNEY D. BENNETT, *Primary Examiner.*

M. F. HUBLER, *Assistant Examiner.*